(12) United States Patent
Peng

(10) Patent No.: US 9,565,072 B2
(45) Date of Patent: Feb. 7, 2017

(54) MOVING MEDIAN USAGE FREQUENCY BASED MAINTENANCE OF SERVER INSTANCES

(71) Applicant: Yu Jun Peng, Shanghai (CN)

(72) Inventor: Yu Jun Peng, Shanghai (CN)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 14/135,525

(22) Filed: Dec. 19, 2013

(65) Prior Publication Data

US 2015/0180732 A1    Jun. 25, 2015

(51) Int. Cl.
    *H04L 12/24*    (2006.01)
    *G06F 9/445*    (2006.01)
    *G06F 9/50*     (2006.01)

(52) U.S. Cl.
    CPC ............. *H04L 41/50* (2013.01); *G06F 8/67* (2013.01); *G06F 9/5027* (2013.01); *G06F 9/5061* (2013.01)

(58) Field of Classification Search
    CPC ...... H04L 41/50; G06F 9/5061; G06F 9/5027; G06F 8/67
    See application file for complete search history.

(56) References Cited

U.S. PATENT DOCUMENTS

| | | | |
|---|---|---|---|
| 7,954,011 B2 | 5/2011 | Ivanov et al. | |
| 8,266,111 B2 | 9/2012 | Lin et al. | |
| 8,429,630 B2 | 4/2013 | Nickolov et al. | |
| 8,433,749 B2 | 4/2013 | Wee et al. | |
| 8,458,717 B1 | 6/2013 | Keagy et al. | |
| 8,495,611 B2 | 7/2013 | McCarthy et al. | |
| 8,601,056 B2 | 12/2013 | Lauwers et al. | |
| 8,619,779 B2 | 12/2013 | Li et al. | |
| 8,621,051 B2 | 12/2013 | Agarwala et al. | |
| 2003/0126202 A1 | 7/2003 | Watt | |
| 2003/0188085 A1* | 10/2003 | Arakawa et al. | 711/100 |
| 2006/0190581 A1* | 8/2006 | Hagale et al. | 709/223 |
| 2009/0037367 A1 | 2/2009 | Wein | |
| 2009/0307030 A1* | 12/2009 | Honda | 705/7 |
| 2012/0062937 A1* | 3/2012 | Kirihara | 358/1.15 |
| 2012/0072985 A1 | 3/2012 | Davne et al. | |
| 2012/0291088 A1 | 11/2012 | Srivastava et al. | |
| 2013/0132545 A1 | 5/2013 | Schultze et al. | |
| 2013/0290499 A1 | 10/2013 | Radhakrishnan | |
| 2014/0108350 A1* | 4/2014 | Marsden | 707/639 |
| 2014/0237090 A1* | 8/2014 | Lassen et al. | 709/223 |

OTHER PUBLICATIONS

Kevin Lehmann, Mean Versus Median, Princeton.edu, Feb. 2, 1998, p. 9.*

* cited by examiner

*Primary Examiner* — Vivek Srivastava
*Assistant Examiner* — Nasim Nirjhar
(74) *Attorney, Agent, or Firm* — Horizon IP Pte. Ltd.

(57) ABSTRACT

A framework for maintaining a plurality of server instances in batches to ensure continuity of service is described herein. In accordance with one aspect, quantities of the server instances are selected in an order based on a usage frequency of the server instances with respect to a median usage frequency of the plurality of server instances. The selected server instances may be logically quarantined for maintenance, one batch at a time. Each batch of server instances may be returned to service when the server instances of the batch are successfully maintained while logically quarantining a next batch of server instances.

13 Claims, 5 Drawing Sheets

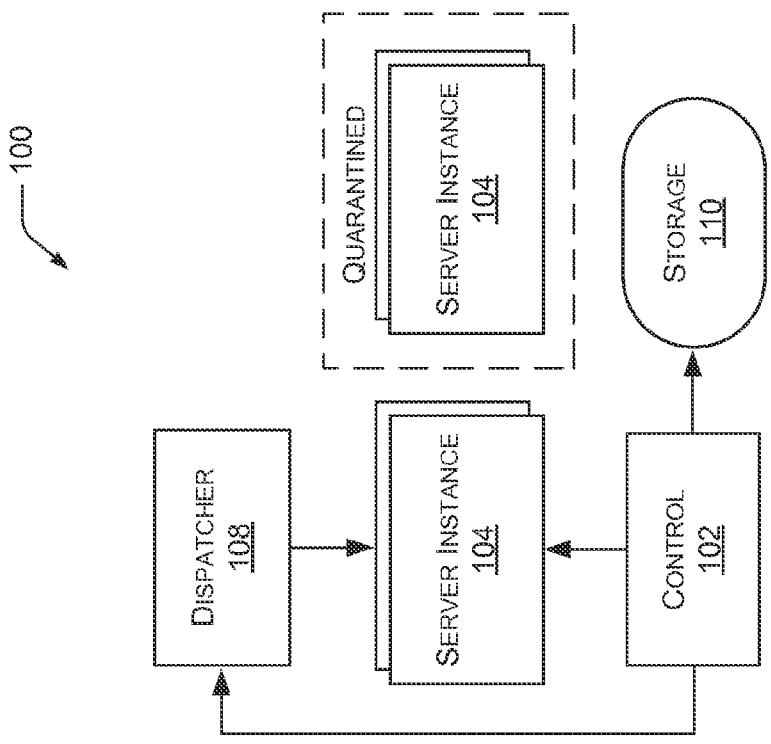

MOVING MEDIAN USAGE FREQUENCY BASED MAINTENANCE OF SERVER INSTANCES

BACKGROUND

To increase the throughput of service, a typical technique includes scaling server instances according to the volume of requests from clients, especially in the cloud computing environment. A cluster of many server instances may be arranged to service various types of client requests. Often, a gateway device will distribute or scatter incoming service requests to individual server instances in the cluster, which service the requests in a more-or-less parallel fashion. For example, many or all of the server instances in the cluster may be capable of servicing various types of requests.

As with most resources, it may be desirable to maintain the server instances periodically. Maintenance updates, new component installations, as well as patches and the like are to be deployed to each of the server instances. Generally, to perform the maintenance, each server instance is quarantined by an IT administrator one-by-one in turn, maintained, and returned to service in the cluster. However, this can be tedious and time-consuming.

SUMMARY

A framework for maintaining a plurality of server instances in batches to ensure continuity of service is described herein. In accordance with one aspect, quantities of the server instances are selected in an order based on a usage frequency of the server instances with respect to a median usage frequency of the plurality of server instances. The selected server instances may be logically quarantined for maintenance, one batch at a time. Each batch of server instances may be returned to service when the server instances of the batch are successfully maintained while logically quarantining a next batch of server instances.

In accordance with another aspect, a system including a plurality of server instances, a dispatcher and a control component is provided. The dispatcher may be coupled to each server instance of the plurality of server instances and arranged to distribute tasks to the server instances. The control component may be arranged to logically decouple a server instance from the dispatcher for maintenance, based on a usage frequency of the server instance with respect to a median usage frequency of the plurality of server instances.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 3 is a block diagram of an example server instance cluster architecture, showing a first server instance quarantined for maintenance;

FIG. 4 is a block diagram of an example server instance cluster architecture, showing multiple server instances quarantined for maintenance;

DETAILED DESCRIPTION

Various techniques and systems for maintaining a plurality of server instances are disclosed, according to example embodiments. For ease of discussion, the disclosure describes the various techniques with respect to server instances arranged in a cloud computing environment. However, the descriptions are also applicable to servers and server instances in other computing environments, networks, other forms and types of computing models, and the like.

In some implementations, techniques and systems are employed to automatically maintain a quantity of server instances, for example, arranged in a cluster. In the example, the multiple server instances are maintained in batches to ensure continuity of service, promote stability, and speed up the maintenance cycle, while providing a high throughput of service to client requests.

Quantities (e.g., batches) of the server instances may be quarantined and maintained in an order based on a median usage frequency of the server instances relative to a median usage frequency of the group. For example, a single server instance may be selected to be quarantined and maintained first, with other server instances maintained afterwards, once the first server instance confirms a successful update (e.g., installed with a new component, upgraded, patched, etc.).

In some implementations, the first server instance to be maintained is selected based on having a usage frequency that is nearest to the median usage frequency of the cluster. In various other implementations, formulas may be used to select or determine the first server instance and subsequent server instances to be maintained.

Various techniques for maintaining a plurality of server instances are disclosed. The discussion herein is intended to illustrate components and techniques which may be utilized in maintaining a plurality of server instances, but the examples described are not intended to be limiting. In various implementations, fewer, alternate, or additional components may be included to perform various portions of described techniques while remaining within the scope of the disclosure.

Figure 1:
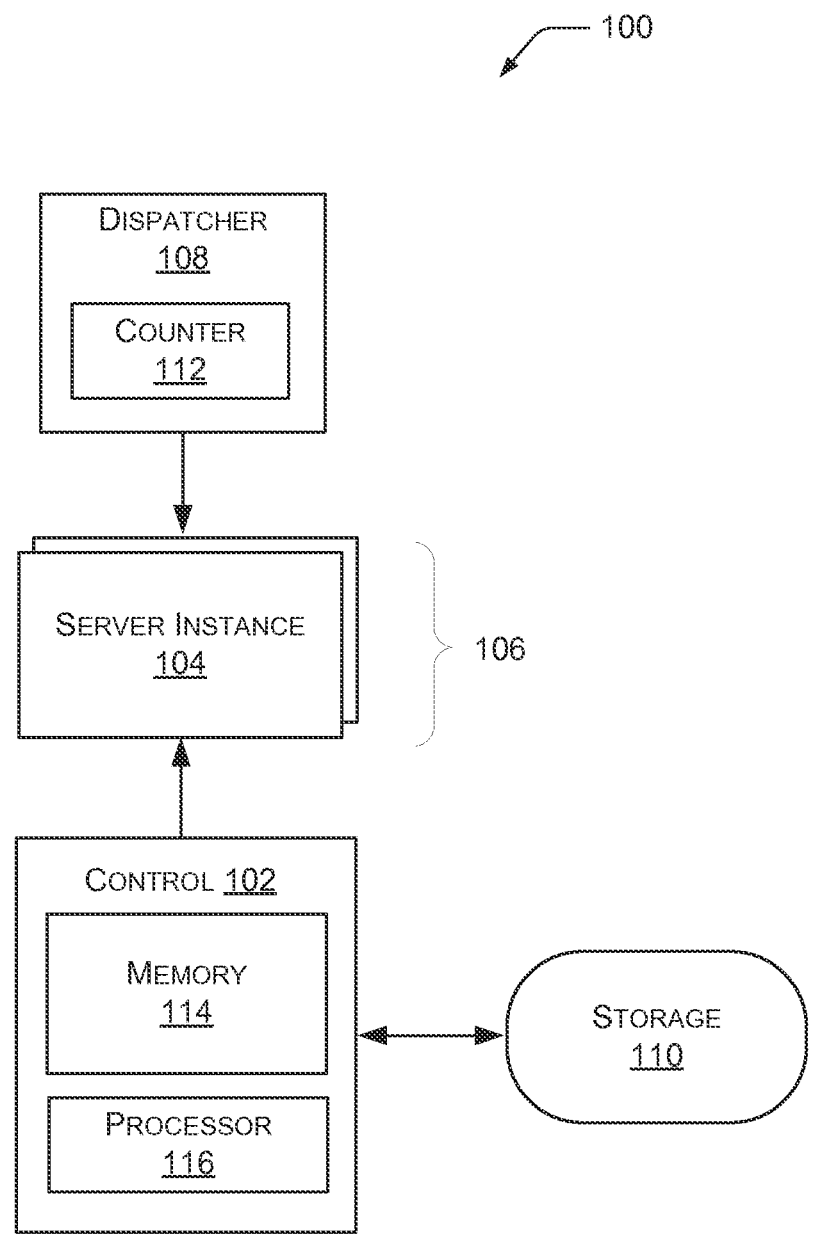
FIG. 1 is a block diagram of an example server instance cluster architecture, wherein the techniques and devices discussed herein may be implemented.

FIG. 1 shows an example of a server instance cluster architecture, illustrating a system 100 wherein the techniques and devices discussed herein may be implemented. In the example, the system 100 uses a control component 102, for example, to automatically provide maintenance to the multiple server instances 104 in the cluster 106. In various implementations, the system 100 includes a dispatcher (or gateway) 108 and may also include a storage component 110.

In an implementation, the dispatcher 108 is coupled to each of the server instances 104. The dispatcher 108 may be arranged to dispatch or distribute requests or tasks to the individual server instances, when client requests or associated tasks are received by the system 100.

In an implementation, as shown in FIG. 1, the dispatcher 108 includes a counter 112 that keeps a usage count for each server instance 104. When a server instance 104 receives and executes a request from the dispatcher 108, the counter 112 increments the usage count for that server instance 104. In one implementation, the counter 112 keeps a usage count for each server instance 104 since an identified component of the server instance 104 was last maintained.

The usage count and/or a usage frequency for each server instance 104 may be stored in the memory 114, for example. The usage frequency may be defined as the number of client requests received by a server instance 104 divided by the number of all server instance requests made to the system 100 since a last maintenance cycle or deployment. In an implementation, the usage frequency of each server instance 104 is calculated by a processor 116 of the control component 102 based on the usage counts stored in the memory 114. Additionally, a median usage frequency of all server instances 104 in the cluster 106 (or in an identified group) may be calculated by the processor 116 of the control component 102.

In various implementations, the system 100 may be connected to a network. The network may include, for instance, a network such as an Ethernet LAN, a token ring LAN, or other LAN, a Wide Area Network (WAN), a system area network, or other type of network, and can include several nodes or hosts (not shown). Moreover, the network can also include hardwired, optical, and/or wireless connection paths.

In an example implementation, the network includes an intranet or the Internet. For example, the storage component 110 may comprise a remote storage, such as a cloud storage component, or the like.

In alternate implementations, the system 100 may be comprised of fewer or additional components, within which differently arranged structures may perform the techniques discussed within the disclosure.

The control component 102 may be arranged to logically decouple (e.g., quarantine) the server instances 104 from the dispatcher 108 for maintenance. The control component 102 may decouple the server instances 104 one at a time, or in batches, based on the usage frequency of the server instances 104 with respect to the median usage frequency of the plurality of server instances 104. In some cases, a first server instance will be maintained first, as a trial run, with the others to follow if the first is successful. In alternate implementations, the control component 102 may use any of various techniques to determine the order that the server instances 104 are quarantined and maintained, based on usage frequencies of the server instances 104 and/or the median usage frequency of the cluster 106.

Figure 2:
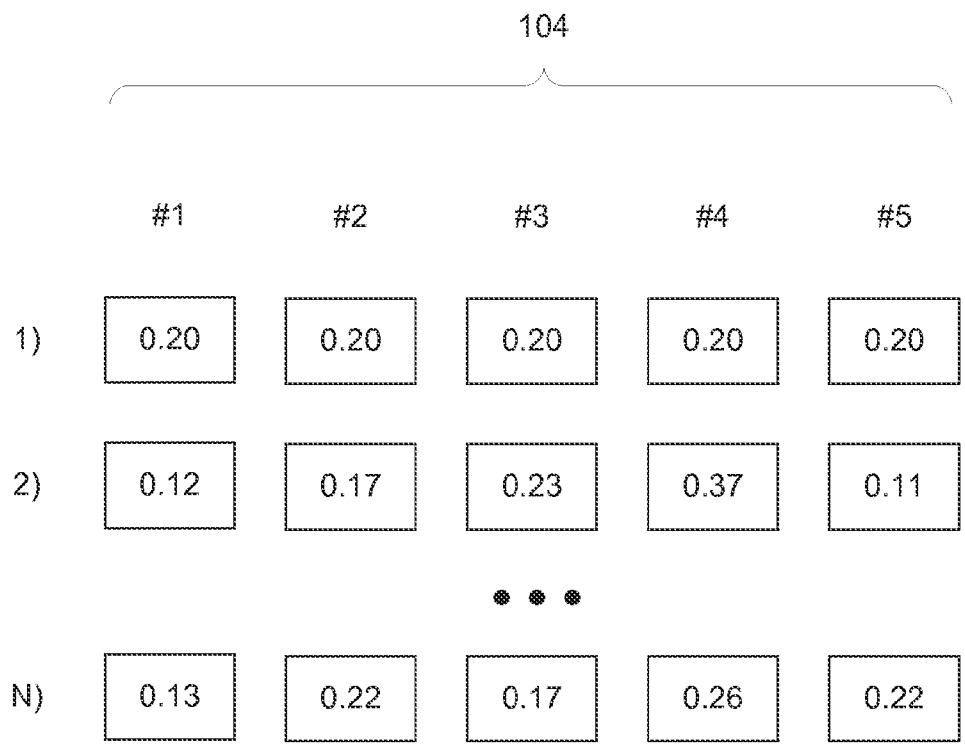
FIG. 2 is a diagram illustrating a series of maintenance cycles, and the associated usage frequencies of illustrated server instances.

One example technique of selecting a first server instance 104 is illustrated in FIG. 2. FIG. 2 is a diagram illustrating a series of maintenance cycles, and the associated usage frequencies of server instances 104. Each row (1, 2, . . . , N) represents a maintenance cycle, where a particular component has been maintained in each of the server instances 104 in the row. Each block (#1, #2, #3, #4, #5) within the rows represents a server instance 104, and shows the usage frequency of that server instance 104 for that maintenance cycle.

As illustrated in FIG. 2, row 1) represents a new deployment, for example, prior to any maintenance. In an implementation, the server instances 104 of the system 100 are logically identical, even if they may have some physical differences. Accordingly, each of the server instances 104 have a usage frequency of 0.20, or usage ratio of ⅕, since each of the 5 server instances receives a client request from the dispatcher 108 with equal frequency.

Row 2) of FIG. 2 represents the usage frequencies of the server instances 104 after a maintenance cycle where component A (e.g., any software, firmware, etc. upgrade, installation, patch, or the like) has been maintained. Row N) of FIG. 2 represents the usage frequencies of the group of server instances 104 after a maintenance cycle where component X (e.g., some other software, firmware, etc. upgrade, installation, patch, or the like) has been maintained. As shown in FIG. 2, the usage frequency of server instance #1 (for example) changes from 0.20 in row 1), to 0.12 after maintenance of component A, and 0.13 after maintenance of component X. This reflects changes in the frequency of server instance #1 to be used to service client requests after maintenance cycles that included maintaining components A and X.

In an implementation, the first server instance 104 to be quarantined by the control component 102 (with each of the other server instances 104 still on-line servicing client requests) is the server instance 104 having a usage frequency nearest to (and above) the median usage frequency of the plurality of server instances 104. For example, in the case of a maintenance cycle following row 2), the control component 102 calculates the median of the usage frequencies of all of the server instances 104 in row 2) (=0.20), and logically decouples the server instance 104 having a usage frequency that is nearest to (and above) the median (#3=0.23). Thus, server instance 104 (#3) is the first server instance 104 to be quarantined by the control component 102 and maintained following the maintenance cycle represented by row 2).

In some implementations, server instance 104 #3 is quarantined and maintained automatically, and a record of whether the maintenance was successful or a failure is stored in the memory 114. (If the maintenance was a failure, it may be performed manually instead.)

In some cases, more than one server instance 104 may have a usage frequency nearest to (and above) the median usage frequency of the plurality of server instances 104. For example, in the case of a maintenance cycle following row N), the median usage frequency is again calculated to be 0.20. This time, two of the server instances 104 (#2 and #5) are equally near to the median usage frequency, each having a usage frequency of 0.22. Thus, in some embodiments, it may be unclear which server instance 104 is to be the first quarantined and maintained (unless both are selected in parallel).

A tie may be broken in a number of ways, according to various implementations. In one implementation, the control component 102 is arranged to quarantine (e.g., logically decouple) a server instance 104 from the dispatcher 108 for maintenance, based on a number of times a preselected component of the server instance 104 has been successfully maintained. For example, the server instance 104 that has had an identified component (e.g., N, X, etc.) maintained successfully the greatest number of times is selected for quarantine and maintenance. Using this technique can increase the stability of the system 100 during the automatic maintenance cycles.

In another implementation, the following formula is used to determine the server instance 104 that is nearest to the median usage frequency (e.g., the server instance 104 selected for quarantine and maintenance).

> Median(N, X)=Max(the usage frequency of a server instance having a usage frequency that is nearest to the average usage frequency of the plurality of server instances since a last maintenance cycle of component X occurred, the instance having a largest ratio of previously being selected and having a successful maintenance of component X for all maintenance cycles of component X).

where N represents the N-th maintenance cycle for component X. In other words, Median(N, X) represents the "median server instance 104" (e.g., the server instance 104 selected for quarantine and maintenance), during the N-th maintenance cycle of component X. This is determined (=Max( . . . , . . . )) as the server instance 104 having the usage frequency nearest to (and above) the median usage frequency, and having the largest ratio of previously being selected and having a successful maintenance of component X for all maintenance cycles of component X.

In an implementation, if the recorded history in memory 114 does not include success/failure records at least as numerous as the quantity of server instances 104 in the cluster 106 (for example 5 records or more, in the example of FIG. 2), then the server instance 104 selected is the one with the last successful maintenance of the component. In other implementations, other techniques may be used to determine the selected (e.g., first) server instance 104, relative to usage frequencies of the server instances 104 and the median usage frequency of the cluster 106.

As shown in FIG. 3 and mentioned above, while the first selected server instance(s) 104 is quarantined and maintained, other server instances 104 still provide service to client requests from the dispatcher 108. In an implementation, the control component 102 is arranged to quarantine (e.g., logically decouple) one or more of the other server instances 104 from the dispatcher 108 for maintenance, based on a usage frequency of the other server instances 104 and the median usage frequency of the plurality of server instances 104, when the maintenance to the first server instance 104 is successful. In other words, once the first selected server instance 104 is successfully maintained, another group of server instances 104 is automatically selected for quarantine and maintenance (as shown in FIG. 4).

In some implementations, the control component 102 selects the next batch (e.g, the next group of server instances 104) for maintenance based on adding the usage frequency of a server instance 104 to the median usage frequency to get a sum. In one example, the server instances 104 having a sum that is nearest to a predetermined value (e.g., 0.50, for example) are selected for the batch. In various implementations, a predefined quantity of server instances 104 may be selected for each batch, or the server instances 104 may be selected based on the relationship of their sum to a threshold value, or the like. For example, the server instances 104 having a sum that is greater or less than the threshold value, or that is a relative value (0.10 for example) from the predetermined value (e.g., 0.50) may be selected for the batch.

Any remaining server instances 104 not selected for the batch remain in service, receiving and servicing client requests from the dispatcher 108.

Figure 5:
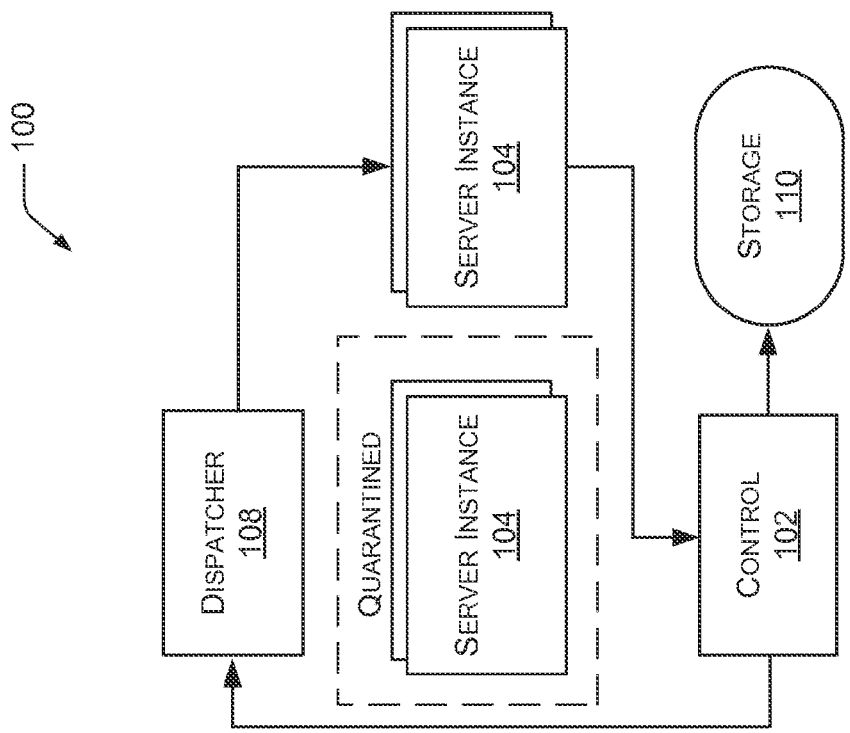
FIG. 5 is a block diagram of an example server instance cluster architecture, showing a dispatcher route based on maintained server instances.

As shown in FIG. 5, in an implementation, the control component 102 is arranged to logically recouple the first server instance 104 and the one or more other server instances 104 (of the next batch, for example) to the dispatcher 108 when maintenance to a threshold quantity of server instances 104 is successful. In various implementations, the threshold quantity may be user selected, programmed, or the like, for stability of the system 100 and for client servicing goals, etc. In the implementation, the control component 102 is arranged to logically decouple the remaining quantity of server instances 104 (if there are any) from the dispatcher 108 for maintenance when the first server instance 104 and the other server instances 104 are recoupled to the dispatcher 108.

Figure 6:
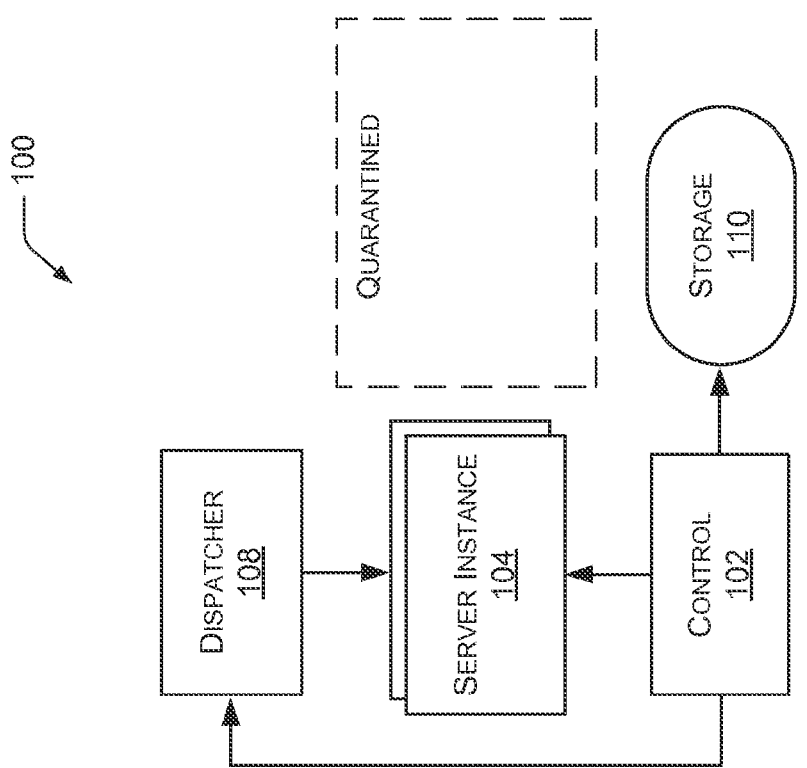
FIG. 6 is a block diagram of an example server instance cluster architecture, showing a completed maintenance cycle.

As shown in FIG. 6, the control component 102 is arranged to logically recouple the remaining quantity of server instances 104 to the dispatcher 108 when maintenance to the remaining quantity of server instances 104 is successful. At this point, all server instances 104 are in service and are coupled to the dispatcher 108. In some examples, this concludes a maintenance cycle of the target component.

Portions of the subject matter of this disclosure can be implemented as a system, method, apparatus, or article of manufacture using standard programming and/or engineering techniques to produce software, firmware, hardware or any combination thereof to control a computer or processor (such as processor 116, for example) to implement the disclosure. For example, portions of an example system 100 may be implemented using any form of computer-readable media (shown as memory 114 in FIG. 1, for example) that is accessible by the processor 116. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 114 is an example of computer-readable storage media. Storage 110, which may include network or cloud storage, for example, is another example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic disks or other magnetic storage devices, or any other medium which may be used to store the desired information and which may be accessed by the processor 116.

In contrast, communication media typically embodies computer readable instructions, data structures, program modules, or other data in a modulated data signal, such as a carrier wave, or other transport mechanism.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multiprocessor computer systems, mini-computing devices, mainframe computers, as well as personal computers, handheld computing devices, microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

Figure 7:
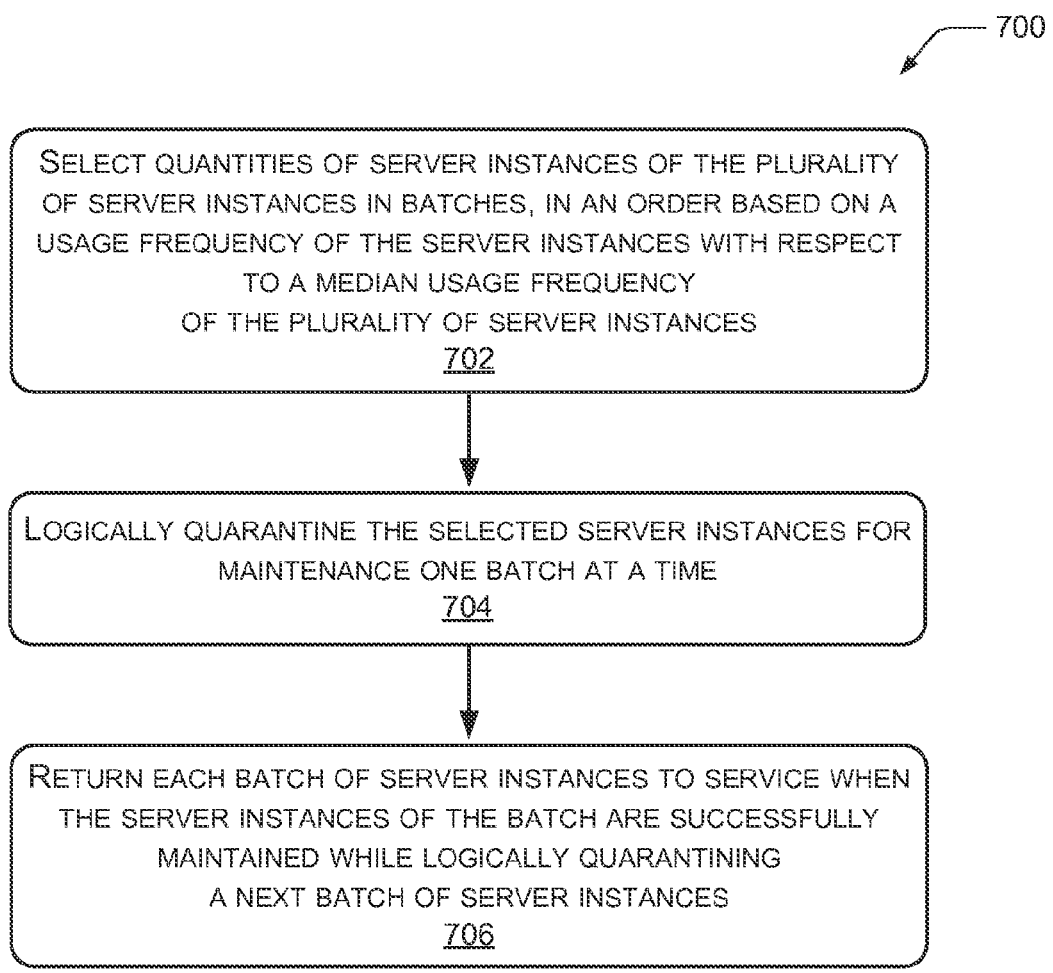
FIG. 7 is a flow diagram illustrating an example process for maintaining a plurality of server instances.

FIG. 7 is a flow diagram illustrating an example process 700 for maintaining a plurality of server instances (such as server instances 104, for example), according to an implementation. The process 700 describes quarantining batches of the server instances, maintaining the server instances, and returning them to service. For example, server instances may be selected for maintenance based on a usage frequency of the server instances. The process 700 is described with reference to FIGS. 1-6.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented with any suitable components, or combinations thereof, without departing from the scope of the subject matter described herein.

At block 702, the process includes selecting quantities of server instances (such as server instances 104, for example) from a plurality of server instances, in batches. In an implementation, the server instances are selected in an order based on a usage frequency of the server instances with respect to a median usage frequency of the plurality of server instances.

In an implementation, the process includes selecting the server instances in an order based on the server instances having a usage frequency nearest to the median usage frequency of the plurality of server instances. In one implementation, the process includes selecting a first server instance from the plurality of server instances, based on the first server instance having a usage frequency that is nearest to a median usage frequency of the plurality of server instances.

In some implementations, the process includes selecting the server instances in an order based on a number of times a preselected component of the server instances has been successfully maintained. In another implementation, the process includes selecting the server instances in an order based on a number of times a server instance has been a first server instance of the plurality of server instances to be selected for maintenance, and the maintenance was successful.

In an implementation, the process includes selecting a server instance (such as the first server instance, for example) based on the formula: Median(N, X)=Max(the usage frequency of a server instance having a usage frequency that is nearest to the average usage frequency of the plurality of server instances since a last maintenance cycle of component X occurred, the instance having a largest ratio of previously being selected and having a successful maintenance of component X for all maintenance cycles of component X), where N represents the N-th maintenance cycle for component X.

In another implementation, the process includes selecting one or more server instances in an order based on a value comprising a sum of the median usage frequency of the plurality of server instances and a usage frequency of a server instance, and the nearness of the value to a preselected threshold.

At block 704, the process includes logically quarantining the selected server instances for maintenance, one batch at a time. In one example, the process includes logically quarantining the first server instance for maintenance as a pioneer case. In various implementations, logically quarantining includes decoupling the selected server instances from a dispatching component, such that the selected server instances may not be assigned a task by the dispatching component.

In an implementation, the process includes performing maintenance, including pushing an installation and/or an update to the first server instance or to the other server instances of the batch in parallel. When the first server instance is successfully maintained, the process includes logically quarantining one or more other server instances (in next batches, for example), based on a sum of a usage frequency of the one or more server instances and the median usage frequency of the plurality of server instances. The process includes performing maintenance to the one or more other server instances in quarantine.

At block 706, the process includes returning each batch of server instances to service when the server instances of the batch are successfully maintained. In an implementation, the process includes returning the batch of server instances to service while logically quarantining a next batch of server instances (for example one batch is quarantined when another batch is returned to service). In an implementation, the server instances (or batches) may be held in quarantine until a threshold quantity of server instances is maintained. When a threshold quantity of server instances has been successfully maintained, the process includes logically coupling the first server instance and the one or more other server instances into service and quarantining one or more remaining server instances. The process includes performing maintenance to the one or more remaining server instances.

In an implementation, when all server instances have been successfully serviced, the process includes logically coupling the one or more remaining server instances into service.

In various implementations, one or more computer readable storage media (as described above) comprise computer executable instructions that, when executed by a computer processor, direct the computer processor to perform operations including at least a portion of the process 700.

In alternate implementations, other techniques may be included in the process in various combinations, and remain within the scope of the disclosure.

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

What is claimed is:

1. One or more non-transitory computer-readable storage media comprising computer executable instructions that, when executed by a computer processor, direct the computer processor to perform operations including:
   selecting a first server instance from a plurality of server instances, based on the first server instance having a usage frequency that is nearest to a median usage frequency of the plurality of server instances;
   logically quarantining the first server instance for maintenance;
   performing maintenance to the first server instance;
   when the first server instance is successfully maintained, determining a value by adding the median usage frequency of the plurality of server instances to a usage frequency of a batch of one or more other server instances, and selecting the batch for logical quarantine in response to nearness of the value to a preselected threshold;
   performing maintenance to the batch of one or more other server instances;
   when a threshold quantity of server instances has been successfully maintained, logically coupling the first server instance and the one or more other server instances into service and quarantining one or more remaining server instances;
   performing maintenance to the one or more remaining server instances; and
   when all server instances have been successfully serviced, logically coupling the one or more remaining server instances into service.

2. The one or more non-transitory computer-readable storage media of claim 1, wherein the first server instance is further selected based on a number of times a component of the first server instance has been successfully maintained.

3. A system, comprising:
   a plurality of server instances;
   a dispatcher coupled to each server instance of the plurality of server instances and arranged to distribute tasks to the server instances; and
   a control component including
      one or more non-transitory computer-readable media for storing computer-readable program code, and
      a processor in communication with the one or more non-transitory computer-readable media, the processor being operative with the computer-readable program code to
         select a first server instance from a plurality of server instances, based on the first server instance having a usage frequency that is nearest to a median usage frequency of the plurality of server instances,
         logically decouple the first server instance from the dispatcher for maintenance,
         perform maintenance to the first server instance,
         when the first server instance is successfully maintained, determine a value by adding the median usage frequency of the plurality of server instances to a usage frequency of a batch of one or more other server instances, and select the batch for logical quarantine in response to nearness of the value to a preselected threshold,
         perform maintenance to the batch of one or more other server instances,
         when a threshold quantity of server instances has been successfully maintained, logically couple the first server instance and the one or more other server instances into service and quarantine one or more remaining server instances,
         perform maintenance to the one or more remaining server instances, and
         when all server instances have been successfully serviced, logically couple the one or more remaining server instances into service.

4. The system of claim 3, further comprising a counter arranged to count a usage of each server instance of the plurality of server instances since a last maintenance of an identified component of each server instance.

5. The system of claim 3, further comprising a memory storage component arranged to store usage counts of each server instance of the plurality of server instances.

6. The system of claim 5, wherein the processor is operative with the computer-readable program code to calculate a median usage frequency and/or a usage frequency of each server instance of the plurality of server instances based on the usage counts stored in the memory.

7. The system of claim 3, wherein the processor is operative with the computer-readable program code to logically decouple the first server instance from the dispatcher for maintenance, based on a number of times a preselected component of the first server instance has been successfully maintained.

8. The system of claim 3, wherein the server instances of the plurality of server instances are logically identical.

9. A method of servicing a plurality of server instances, comprising:
   selecting a first server instance from a plurality of server instances, based on the first server instance having a usage frequency that is nearest to a median usage frequency of the plurality of server instances;
   logically quarantining the first server instance for maintenance;
   performing maintenance to the first server instance;
   when the first server instance is successfully maintained, determining a value by adding the median usage frequency of the plurality of server instances to a usage frequency of a batch of one or more server instances, and selecting the batch for logical quarantine in response to nearness of the value to a predetermined threshold;
   performing maintenance to the selected batch of one or more other server instances;
   when a threshold quantity of server instances has been successfully maintained, logically coupling the first server instance and the one or more other server instances into service and quarantining one or more remaining server instances;
   performing maintenance to the one or more remaining server instances; and
   when all server instances have been successfully serviced, logically coupling the one or more remaining server instances into service.

10. The method of claim 9, wherein the performing maintenance comprises pushing an installation or an update to the server instances of the batch in parallel.

11. The method of claim 9, further comprising selecting the server instances in an order based on a number of times a preselected component of the server instances has been successfully maintained.

12. The method of claim 9, further comprising selecting the server instances in an order based on a number of times a server instance has been a first server instance of the plurality of server instances to be selected for maintenance, and the maintenance was successful.

13. The method of claim 9, wherein the logically quarantining includes decoupling the selected server instances from a dispatching component, such that the selected server instances may not be assigned a task by the dispatching component.

\* \* \* \* \*